United States Patent Office 3,238,165
Patented Mar. 1, 1966

3,238,165
MIXTURE OF POLYEPOXIDE, POLYTHIOMER-
CAPTAN, AND PETROLEUM DERIVED BITU-
MINOUS MATERIAL
Warren C. Simpson, Berkeley, and Harry J. Sommer,
Lafayette, Calif., assignors to Shell Oil Company, New
York, N.Y., a corporation of Delaware
No Drawing. Filed Apr. 10, 1961, Ser. No. 101,647
18 Claims. (Cl. 260—28)

This invention relates to new bituminous compositions. More particularly, the invention relates to new bituminous compositions containing special reactive components which are particularly suited for use as coatings for vehicular and pedestrian traffic areas and/or as binders for aggregate in the construction of new traffic areas.

Specifically, the invention provides new and particularly useful compositions comprising a mixture of (1) a polyepoxide having a more than one vic-epoxy group, and preferably a glycidyl ether of a polyhydric phenol, (2) a polythiopolymercaptan, and (3) a bituminous material, and preferably a petroleum derived bituminous material, such as asphalt.

As a special embodiment, the invention provides a process for utilizing the above-described compositions as overlying or surfacing materials for already constructed concrete, asphalt, wood or metal traffic areas. As a further embodiment, the invention provides a process for utilizing the above-described compositions as binders for aggregate in the construction of new traffic areas.

There is a growing need for better materials for construction of roadways, airfields, docks and the like. Such materials, for example, should have better wear resistance, better solvent and heat resistance (as in the case of asphalt roads) and better resistance to skidding. There is also a need for an economical surfacing composition than can be applied to already formed concrete and asphalt road or storage areas to help reduce the destruction due to wear, rain, deicing salts and cold weather. In the case of asphalt surfaces, there is also a need for coatings which would improve resistance to heat and solvents. This is particularly urgent in the case of asphalt runways for jet aircraft as the heat of the jet engines as well as the jet fuels readily attack asphalt surfaces. Further, concrete and asphalt road surfaces and exposed metal on bridge roadways, etc. tend to develop dangerously smooth surfaces due to wear which cause skidding when wet, and there is a great need for a non-skid coating that will adhere to these surfaces.

Various compositions have been suggested for the above purposes, but the compositions suggested heretofore have not proved very satisfactory. In most case, the compositions fail to have any improved wearability, solvent resistance or skid resistance. In the case of the coatings, the coatings fail to have the necessary adhesion to the concrete, asphalt and metal surfaces, particularly if they are the least oily or dirty. In other cases, the coatings are too hard and brittle for use on large areas. In still other cases, the coatings fail to stand up under inclement weather conditions. In still other cases, the coatings fail to have the necessary resistance to solvents and heat or fail to have good wear and non-skid properties. In still other cases, the coatings are satisfactory at normal temperatures but crack at the low freezing temperatures.

It is an object of the invention, therefore, to provide new compositions which are suitable for use as in the construction of new roadways, airfields walkways, and the like. It is a further object to provide a binder for use in making improved roadways and walkways. It is a further object to provide new surfacing compositions which when cured have good adhesion to concrete, asphalt, wood and metal surfaces. It is a further object to provide new compositions which form coatings for concrete, asphalt, wood and metal having good resistance to wear, rain and cold weather. It is a further object to provide coatings which are resilient and flexible at low temperature. It is still a further object to provide new surfacing compositions which form films having good resistance to solvents and heat. It is a further object to provide new surfacing compositions which have good skid resistance. It is a further object to provide new coatings which are relatively inexpensive and can be easily applied to new and old surfaces. Other objects and advantages of the invention will be apparent from the following detailed description thereof.

It has now been discovered that these and other objects may be accomplished by the compositions of the invention comprising a mixture of (1) a polyepoxide having more than one vic-epoxy group, (2) a polythiopolymercaptan and (3) a bituminous material.

It has been unexpectedly found that the above-described compositions are good binders for aggregate and in combination therewith form compositions which can be used to form superior roadways, airfields, walkways and the like. The roadways, etc. prepared from these special compositions have good wearability, flexibility, excellent heat resistance and solvent resistance and good skid resistance.

It has also been found that these mixtures form coatings which when cured have good adhesion to concrete, asphalt, wood and metal surfaces. In addition, the coatings are resilient and tough and have good flexibility even at lower temperatures. The coatings also display good resistance to solvents and heat. When small inert particles are added to the coating, the compositions have excellent resistance to skidding. The coatings are attractive for use on highways and runways as they can be easily applied to large areas and set up quickly without the use of any special curing conditions. These compositions have been found to be useful not only for the treatment of highways and road surfaces, but are equally valuable for the treatment of dock areas, warehouse floors, sidewalks, tennis courts, ship decks, and the like where wear and weather resistant properties are desired.

The new compositions have also been found to be useful and valuable as caulking compounds and as sealer compositions for cracks, etc. in vehicular and pedestrial traffic areas.

A particular advantage of the new compositions is the fact that they may be cured at low temperatures and do not require the use of special heating means. A further advantage is the fact that many of the compositions, and particularly those prepared from the residual fuel oils or compositions containing diluents, such as the hydrocarbon nitriles, monoglycidyl derivatives and the like, have low viscosities and can be sprayed, brushed or otherwise applied, and are thus more easily handled than conventional coatings or binders.

The bituminous material used in the present compositions include products derived from petroleum, such as, for example, asphalts, residual fuel oils and the like. Preferred asphalts comprise straight run, blown, cracked, aromatic, and catalytically or non-catalytically polymerized asphalts. Beneficial effects are attained by the modification of all types of asphalts regardless of their original penetrations or softening points. Aromatic asphalts may be improved with respect to their flexibility by use of the present invention and thus broaden the possible uses of these products which are normally hard and brittle. A typical aromatic asphalt comprises the bottom product from the distillation of catalytically cracked gas oil.

Straight run asphalts which are used, for example, for paving grade purposes are greatly improved by the incorporation of the polymerized products as described previously. Normally, straight run asphalts particularly suitable for paving purposes have penetrations between about 40 and 300 and softening points within the range from about 145° F. to about 95° F. Blown asphalts, suitable for use in roofing may be improved with respect to their penetration and softening point relationships by the use of the present invention. Blown asphalts are normally produced in the presence or absence of catalysts by blowing at elevated temperatures with an oxygen-containing gas such as air. A typical asphalt may have a softening point range of between about 240° F. and about 160° F. and a penetration within the range from about 30 to about 5.

Other preferred materials include high boiling extracts of petroleum, such as those obtained by extracting petroleum with solvents having preferential selectivity for aromatic. To obtain such extracts various non-reactive, highly polar, aromatically preferential solvents are used such as liquid $SO_2$, phenol, cresylic acid, furfural, beta, beta-dichloroethyl ether, nitrobenzene and the like. The use of the so-called double solvent process employing mutually immiscible solvents like cresylic acid and propane also gives suitable extracts. Especially preferred are the Edeleanu and furfural extracts of petroleum distillates, i.e., extracts obtained by use of liquid $SO_2$ or liquid $SO_2$ in combination with benzene, etc. The extracts are high-boiling materials which range in general from viscous liquids to tar-like materials at ordinary temperatures. Extracts boiling above 300° C. at 760 mm. Hg are preferred.

Another preferred group of bituminous materials include residual fuel oils, such as residual fuel oils having a viscosity between 10 cs. at 100° F. to about 1500 cs. at 100° F.

Another preferred group includes materials derived from coal such as coal tars, refined coal tars and coal tar pitches, and preferably those having a softening point below 190° F. and a solubility in carbon disulfide of at least 50%. The expression "tar" as used herein refers to products obtained in connection with the destructive distillation of coal. When part of the volatile material is removed, the residue is called "refined coal tar." When additional volatile material is removed, the residue is called "coal tar pitch." Residuals having a fusing point below about 90° F. are referred to herein as refined coal tar pitches. As used herein, in reference to coal tar products, "softening point" of "fusing point" refers to values obtained by the cube method as described in vol. II, Abraham, "Asphalts and Allied Substances," 5th edition. The coal products should preferably possess at least 50% and preferably 75% solubility in carbon disulfide. The coal tar, refined coal tar and coal tar pitch may be acidic, basic or neutral, depending on whether the acids and/or bases have been removed. These coal products may be obtained from various types of bituminous coals, such as, for example, cannel, bog-peat, carbonite, and the like, and may be derived from various processes, such as from gas works, coke ovens, blast furnaces, gas producers, and various low temperature processes. Description of various types of coal tars, refined coal tars and coal pitches, as well as other materials which may be used in the process of the invention, such as middle oil and the like may be found in Abraham, "Asphalt and Allied Substances," particularly pages 384 and 405.

The polyepoxides to be used in preparing the compositions of the invention comprise those materials possessing more than one vicinal epoxy group, i.e., more than one

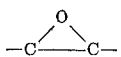

group. These compounds may be saturated or unsaturated, aliphatic, cycloaliphatic, aromatic or heterocyclic and may be substituted with substituents, such as chlorine, hydroxyl group, ether radicals and the like. They may be monomeric or polymeric.

For clarity, many of the polyepoxides and particularly those of the polymeric type are described in terms of epoxy equivalent values. The meaning of this expression is described in U.S. 2,633,458. The polyepoxides used in the present process are those having an epoxy equivalency greater than 1.0.

Various examples of polyepoxides that may be used in the process of the invention are given in U.S. 2,633,458 and it is to be understood that so much of the disclosure of that patent relative to examples of polyepoxides is incorporated by reference into this specification.

Other examples include the epoxidized esters of the polyethylenically unsaturated monocarboxylic acids, such as epoxidized linseed, soybean, perilla, oiticica, tung, walnut and dehydrated castor oil, methyl linoleate, butyl linolenate, ethyl 9,12-octadecadienoate, butyl 9,12,15-octadecatrienoate, ethyl elaeostearate, octyl 9,12-octadecadienoate, methyl elaeostearate, monoglycerides of tung oil fatty acids, monoglycerides of soybean oil, sunflower, rapeseed, hempseed, sardine, cottonseed oil, and the like.

Another group comprises the diglycidyl esters of dibasic acids such as adipic, pimelic, suberic, azelaic, sebacic, maleic, phthalic, terephthalic, isophthalic and the like.

Another group of the epoxy-containing materials used in the process of the invention includes the epoxidized esters of unsaturated monohydric alcohols and polycarboxylic acids, such as, for example, di(2,3-epoxybutyl) adipate, di(2,3-epoxybutyl) oxalate, di(2,3-epoxyhexyl) succinate, di(3,4-epoxybutyl) maleate, di(2,3-epoxyoctyl) pimelate, di(2,3-epoxybutyl) phthalate, di(2,3-epoxybutyl) tetrahydrophthalate, di(4,5-epoxydodecyl) maleate, di(2,3-epoxybutyl) tetraphthalate, di(2,3-epoxypentyl) thiodipropionate, di(5,6-epoxytetradecyl) diphenyldicarboxylate, di(3,4-epoxyheptyl) sulfonyldibutyrate, tri(2,3-epoxybutyl) - 1,2,4 - butanetricarboxylate, di(5,6-epoxypentadecyl) tetrate, di(4,5-epoxytetradecyl) maleate, di(2,3-epoxybutyl) azelate, di(3,4-epoxybutyl) citrate, di(5,6-epoxyoctyl) cyclohexane-1,3-dicarboxylate, di(4,5-epoxyoctadecyl) malonate.

Another group of the epoxy-containing materials include those epoxidized esters of unsaturated alcohols and unsaturated carboxylic acids, such as 2,3-epoxybutyl 3,4-epoxycyclohexanoate, 3,4-epoxycyclohexyl 4,5-epoxyoctanoate, 2,3 - epoxycyclohexylmethyl epoxycyclohexane carboxylate.

Still another group of the epoxy-containing material include epoxidized derivatives of polyethylenically unsaturated polycarboxylic acids such as, for example, dimethyl 8,9,12, 13-diepoxyeicosanedioate, dibutyl 7,8,11,12-diepoxyoctadecanedioate, dioctyl 10,11-diethyl-8,9,12,13-diepoxyeicosanedioate, dihexyl 6,7,10,11-diepoxyhexadecanedioate, didecyl cyclohexane-1,2-dicarboxylate, dicyclohexyl 3,4,5,6-diepoxycyclohexane-1,2-dicarboxylate, dibenzyl 1,2,4,5-diepoxycyclohexane-1,2-dicarboxylate and diethyl 5,6,10,11-diepoxyoctadecyl succinate.

Still another group comprising the epoxidized polyesters obtained by reacting an unsaturated polyhydric alcohol and/or unsaturated polycarboxylic acid or anhydride groups, such as, for example, the polyester obtained by reacting 8,9,12,13-eicosadienedioic acid with ethylene glycol, the polyester obtained by reacting diethylene glycol with 2-cyclohexene-1,4-dicarboxylic acid and the like, and mixtures thereof.

Still another group comprises the opoxidized polyethylenically unsaturated hydrocarbons, such as epoxidized 2,2-bis(2-cyclohexenyl) propane, epoxidized vinyl cyclohexene and epoxidized dimer of cyclopentadiene.

Another group comprises the epoxidized polymers and copolymers of diolefins, such as butadiene. Examples of this include, among others, butadiene-acrylonitrile copolymers (Hycar rubbers), butadiene styrene copolymers and the like.

The polyepoxides that are particularly preferred for use in the compositions of the invention are the glycidyl ethers and particularly the glycidyl ethers of polyhydric phenols and polyhydric alcohols. The glycidyl ethers of polyhydric phenols are obtained by reacting epichlorohydrin with the desired polyhydric phenols in the presence of alkali. Polyethers A, B, C and D described in U.S. 2,633,458 are good examples of polyepoxides of this type. Other examples include the polyglycidyl ether of 1,1,2,2-tetrakis(4-hydroxy-henyl)ethane (epoxy value of 0.45 eq./100 g. and melting point 85° C.) polyglycidyl ether of 1,1,5,5-tetrakis(hydroxyphenyl)pentane (epoxy value 0.514 eq./100 g.) and the like and mixtures thereof.

The compounds to be combined with the above-described polyepoxides and bituminous materials comprise the polythiopolymercaptans and particularly the liquid polythiopolymercaptans having molecular weights below about 10,000.

These polythiopolymercaptans include those compounds of the formula HS—R . . . SS . . . R—SH wherein R is any organic radical and preferably an oxahydrocarbyl, thiahydrocarbyl or hydrocarbyl radicals as may contain up to 25 carbon atoms.

A preferred group of polythiopolymercaptans comprise those obtained by treating polymercaptans, such as the alkanedithiols, alkenedithiols and cycloalkanedithols, cycloalkenedithiols and substituted derivatives thereof, with agents, such as hydrogen peroxide or sodium peroxide. Polymers of the formula

HS(C$_2$H$_4$OCH$_2$OC$_2$H$_4$SS)$_n$C$_2$H$_4$OCH$_2$OC$_2$H$_4$SH may be obtained, for example, by treating dimercapto diethyl formal with hydrogen peroxide. A more detailed description of the preparation of this type of polymer may be found in Patrick, U.S. 2,466,963.

Polythiopolymercaptans useful in the process of the invention may also be prepared by reacting an organic dihalide with sodium polysulfide to form a high molecular weight polymer containing a plurality of disulfide linkages and then depolymerizing or degrading that polymer, preferably by treating a water dispersion of the polymer with sodium hydrosulfide and sodium sulfite. Organic halides used for this purpose may be exemplified by ethylene dichloride, propylene dichloride, dichlorobutane, triglycol dichloride, glycerol dichlorohydrin, dichloroethyl formal, dichlorobutyl ether, dichloroethyl ether, dichloropropionic acid, and mixtures thereof. The molecular weight of the resulting polythiopolymercaptan may be controlled by regulating the proportions of reactants. A more detailed description of the preparation of these polymers may be found in Patrick, U.S. 2,466,963.

Polythiopolymercaptans having molecular weights below about 20,000 and preferably below 12,000 are generally preferred. Particularly preferred polythiopolymercaptans are the liquid polythiopolymercaptans having a molecular weight betwen 300 and 4000.

Of special interest, particularly because of the good results obtained therewith are the liquid polythiopolymercaptans prepared by reacting dichloroethyl formal, preferably in the presence of small quantities, e.g., 1%, 2% or 3%, of trifunctional products as trichloropropane, with sodium polysulfide and then treating a water dispersion of the polymer with sodium hydrosulfide and sodium sulfite to give products of a molecular weight between 300 and 10,000 and preferably between 300 and 4000.

Catalysts may also be included in the reaction mixture to speed the cure of the reaction mixture. Examples of these include, among others, tertiary amines, amine salts, quaternary ammonium salts, phosphines and the like.

Preferred amines are the tertiary amines, such as, for example, p,p'-bis(dimethylaminophenyl)methane, pyridine, dimethyl aniline, benzyldimethyl amine, dimethylethanolamine, methyldiethanol amine, morpholine, dimethylaminopropylamine, dibutylaminopropylamine, stearyldimethylamine, tri-n-butyl amine, N,N-dibutyl butylamine, tri-n-hexylamine, ethyl di-n-propylamine, phenylene diamine, diethylene triamine and the like, and mixture thereof. The salts may be exemplified by the inorganic and organic acid salts of the amines, such as, for example, the hydrochloride, sulfate and acetate of each of the above-described tertiary amines. The quaternary ammonium salts may be exemplified by the following: benzyltrimethylammonium chloride phenyltributylammonium chloride, cyclohexyltributylammonium sulfate, benzyltrimethylammonium sulfate, benzyltrimethylammonium borate, diphenyldioctyl ammonium chloride, and the like, and mixtures thereof.

Other preferred activators to be used are the hydrocarbon tertiary amines, and more preferably the amono- and diamines wherein the amine hydrogen have been replaced by aliphatic, cycloaliphatic or aromatic hydrocarbon radicals containing not more than 15 carbon atoms, such as, for example, the trialkyl amines, triaryl amines, triarylalkylamines, alkyl arylalkylamines, tricycloalkylamines, alkyl dicycloalkyl amines, diaminoalkanes, dialkylene triamines, phenylene diamines and di(aminoaryl)alkanes. Preferred amine salts are the hydrochloride, sulfate and acetate of the above-described preferred amines. The preferred quaternary salts are those of the formula

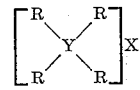

wherein Y is nitrogen, R is an alkyl, aryl or alkylalkyl radical, preferably containing no more than 12 carbon atoms and X is chlorine.

The compositions of the invention may be prepared by any suitable method. The compositions may be prepared, for example, by simply mixing the components together in any order with or without the application of heat. If one or more of the components are very thick liquid or solids, it is generally preferred to heat them before or during the mixing. Various solvents or diluents which will evaporate before or during cure may be added to assist in the preparation of the mixture, but the addition of these materials is not generally desirable as it usually lengthens the time of cure of the finished product. Suitable solvents include hydrocarbons, such as xylene, benzene, and the like. It is also convenient in some cases to employ all liquid polyepoxides, such as normally liquid glycidyl polyethers of polyhydric alcohols, as the diluent, or to utilize monoglycidyl derivatives such as butyl glycidyl ether, allyl glycidyl ether, etc., or other reactive materials such as nitriles, as acrylonitrile, propiononitrile and the like.

It is preferred to mix the polythiopolymercaptan with the bituminous material and then add the polyepoxide, but satisfactory results are also obtained by mixing all three components together or by adding the polyepoxide to the asphalt before adding the polythiopolymercaptan.

The ratio of the bituminous material and the polyepoxide in the composition may vary depending upon the properties desired in the resulting product. Compositions having the above-described unexpected properties, such as good compatibility, excellent adhesion and superior coating properties, are obtained when the polyepoxide makes up at least 5% and preferably 15% to 90% by weight of the mixture of bituminous and polyepoxide.

The amount of the polythiopolymercaptan employed in the composition may vary within certain limits, as long as it effects a conversion of the composition to an insoluble, infusible product, e.g., a product which has good resistance to softening by acetone. There should preferably be at least .8 equivalents of the polythiopolymercaptan per equivalent of the polyepoxide. As referred to herein in relation to the proportion of polythiopolymercaptan and polyepoxide, chemical equivalent amount refers to that amount needed to furnish one —SH group per epoxy group. Preferred amounts vary from about .8 to 4 equivalents of the polythiopolymercapton per equivalent of the polyepoxide and more preferably from 3 to 3.5 equivalents. A portion e.g., up to 50% by weight of the polythiopolymercaptan may be replaced by other materials, such as long chain acids, polyamines, polyamides or other known curing agents, such as polybasic acid anhydrides, alkalis, metal salts and the like.

It is also preferred in some cases to add other materials, such as alkylated phenols as dinonyl phenol, didodecylphenol and the like which act as accelerators for the cure as well as aid in mixing.

An especially preferred type of composition covered by the present invention includes those wherein inert solid particles are used either in preparation of roadways or on coatings to give the coating excellent skid resistance. The particles should be rather finely divided and preferably have a mesh size varying from 4–300. Preferred materials include sand, finely divided rocks, finely divided shells, crushed quartz, fused aluminum oxide grits, finely divided resinous particles, and the like. Particularly preferred are the minerals, and especially the siliceous materials, such as, for example, sand and ground rock. Mixtures of various types of particles may also be used.

The amount of the inert particles to be added to the composition should be at least 50% by weight of the total mixture of bituminous material and polyepoxide and should preferably be between 70% to 2000% by weight of the mixture.

The inert particles may be added to the composition or any one or more of the components before mixing. It is generally preferred to combine the above components together and then add the inert particles to the mixture or applied as a layer on top of the mixture. Thus, in coating highway surfaces, the bituminous material-polyepoxide-polythiopolymercaptan mixture may be applied directly to the road surfaces and then the inert particles, such as sand, may then be sprinkled onto the coating before it is cured.

The particles may be heated if desired to assist in the cure. Thus, aggregate heated to temperatures ranging from about 150° F. to 400° F. is useful in speeding cure of roadbeds and coatings.

When used as coatings, the compositions of the invention may be applied to any surface, but are particularly suitable for use as surfacing compositions for concrete, asphalt, wood, and steel. The concrete may be of any of the usual types such as may be prepared from hydraulic cements, such as Portland cement and other types of aluminous and oxy salt type cements. The asphalt surfaces may be those prepared from straight run asphalts or further refined or modified asphalts. The compositions may be applied in very thin coatings or in very thick coatings. The application to the surface can be accomplished in any suitable manner. If material is thick or contains large amounts of inert particles, the material may best be applied by use of a screed, trowel, shovel or broom. If it is of a more fluid nature, it may be applied by brushing or spraying. The coatings will generally vary in thickness from about 1/16 inch to about 1/2 inch.

The following examples illustrate the present invention. Unless otherwise specified, parts disclosed in the examples are parts by weight. Polyether resins described in the examples by letters are those described in U.S. 2,633,458. The concrete used in the examples was prepared from hydraulic cement (Portland cement), aggregate containing sand and water.

*Example I*

This example illustrates the preparation and some of the properties of a composition containing polyether A, coal tar RT-12 and a polythiopolymercaptan having a molecular weight of about 4000 (Thiokol LP-2) prepared by reacting dichloroethyl formal and about 2% trichloropropane with sodium polysulfide and then dipolymerizing the resulting product. This polythiopolymercaptan has the structure $$HSC_2H_4OCH_2OC_2H_4(SSC_2H_4OCH_2OC_2H_4)_nSH$$

12% by weight of polyether A and 52% by weight of a mixture of 90 parts coal tar RT-12 and 10 parts dinonyl phenol are mixed together with heating. To this mixture was added 36% by weight of the above described polythiopolymercaptan and 2% tri(dimethylaminoethyl) phenol, and the mixture spread on a section of an asphalt highway which had been cleaned with detergents to form a coating of about 1/16 inch thickness. In a short time, at atmospheric temperature the composition sets up to form a homogeneous resilient flexible solvent resistant coating that has good adhesion to the asphalt surface.

To test the resistance of the coating to solvents, jet fuel is sprayed twice a day on the coating. No change is noted in the condition of the pavement even after 6 weeks. During a similar period of use and treatment, the unmodified asphalt road softens and starts to disintegrate.

Metallic panels (steel and aluminum) and concrete panels coated with the above mixture also remain undamaged by jet fuels.

*Example II*

12% by weight of polyether A and 52% by weight of a mixture of 60 parts straight run asphalt and 40 parts dinonyl phenol combined together with heating. 36% by weight of polythiopolymercaptan shown in Example I and 2% of tri(dimethylaminomethyl)phenol are then added to the mixture. This mixture is stirred and then spread on smooth concrete at a rate of about one pound per square yard. The coating cures to form a resilient tough flexible coating.

In a similar experiment, sand is spread on the coating before cure was complete. The resulting coating sets up to form a hard skid resistant film which has good flexibility.

Similar results are obtained by varying the amount of the polythiopolymercaptan from 20% to 10%.

*Example III*

This example illustrates the formation of a thick roadway surfacing.

12% by weight of polyether A and 52% by weight of a mixture of 60 parts straight run asphalt and 40 parts dinonyl phenol was mixed with heating and then 36% by weight of a polythiopolymercaptan having the formula as in Example I and a molecular weight of about 2,000 and an equal weight of the combined mixture of crushed quartz are added. When the mixture is complete, the composition is applied at a rate of 10 pounds per square yard on a concrete surface with screeds and/or trowels. After a smooth layer is applied, additional crushed quartz is sprinkled over the surface and rolled with a lawn roller to gain greater compaction. After hardening is complete, the excess grit is swept off. Concrete surfaces so treated have good resistance to skidding and good resistance to weather conditions.

*Example IV*

This example illustrates the preparation and some of the properties of the composition containing polyether D, a polythiomercaptan and a low viscosity rapid curing asphalt cutback.

Polyether D is dissolved in a solvent made up of 90 parts of xylene and 10 parts Cellosolve so as to form a 70% solution. The polythiopolymercaptan noted in Example I is dissolved in the same solvent to form an 85% solution. 15% by weight of the polyether D solution, 30% by weight of the polythiopolymercaptan solution and 55% by weight of a mixture of 60 parts medium curing asphalt cut back 100–200 SSF at 140° F. and 40 parts dinonyl phenol mixed together with heating. The resulting mixture is spread on a section of concrete highway which has been previously cleaned with hydrochloric acid. The coating is about 1/16 inch thick. In a short time at atmospheric temperature, the composition sets up to form a hard solvent resistant coating.

*Example V*

The composition prepared in the previous example is spread on an asphalt highway previously cleaned with detergent solution. The coating is about 1/16 inch thick. Sand is then sprinkled on the top before the cure is complete. The resulting coating sets up to form a hard tough resilient skid resistant film.

*Example VI*

40 parts polyether A are heated with 60 parts of trimerized linoleic acid to form a precondensation product. The polythiopolymercaptan described in Example I and a medium curing cutback asphalt 100–200 SSF at 140° F. are then added to the precondensate. The components appear in the following proportions:

23.6% medium curing cutback asphalt
21.3% polythiopolymercaptan
22.0% polyether A
33.1% trimerized linoleic acid This mixture is stirred and 100% by weight of sand added thereto. This mixture is spread as thick coating to concrete blocks and then sand sprinkled on the top before cure is complete. The resulting coating is a resilient solvent resistant coating which had good skid resistance.

*Example VII*

Polyether A, the polythiopolymercaptan described in Example I, an asphalt having viscosity of 705 centistokes at 140° F. and a $C_{12}$ primary amine were combined together with heating. The components were present in the following proportions:

36% polyether A
30% asphalt
20% polythiopolymercaptan
14% $C_{12}$ primary amine This mixture is stirred and then spread on asphalt highway at the rate of about one pound per square yard. Sand is then spread on top of the coating before cure is complete. The resulting coating set up to form a hard tough resilient skid resistant film.

The above experiment is repeated with the exception that 200% by weight of sand was included in the initial mixture. This mixture was then spread on concrete to form a hard skid resistant coating.

*Example VIII*

This example illustrates the preparation and some of the properties of a composition containing polyether A, a polythiopolymercaptan as in Example I and an asphaltic material comprising the bottoms from the distillation of a catalytically cracked gas oil.

About 15% by weight of the polyether A is combined with 65% of a mixture of 50 parts by weight of the above-described asphaltic material by weight of dinonyl phenol and 20% by weight of the polythiopolymercaptan.

This mixture is spread on a section of an asphaltic roadway to form a coating of about 1/16 inch thick. 30 mesh aluminum oxide is strewn over the surface before it has set hard. The resulting coating is a hard non-skid coating having good weather resistance.

*Example IX*

20% by weight of triglycidyl ester of trimerized linoleic acid 50% by weight of straight run asphalt and 30% by weight of a liquid polythiopolymercaptan having the formula as in Example I and a mol weight of about 600 and 2% by weight of tri(dimethylaminomethyl)phenol are combined together.

This mixture is spread on section of a concrete highway to form a coating of but 1/16 inch thick. 30 mesh aluminum oxide is strewn over the surface before it has set hard. The resulting coating is a hard tough non-skid coating having good weather resistance.

Related results are obtained by replacing the triglycidyl ester in the above process with equal amounts of each of the following: diglycidyl ester of dimerized linoleic acid, triglycidyl ester of trimerized eicosadienedioic acid.

*Example X*

This example illustrates the preparation and some of the properties of a composition containing polyether A, a polythiopolymercaptan and a residual fuel oil.

About 20% by weight of polyether A is combined with 50% by weight of an industrial fuel oil having the following properties:

Gravity, ° API _____ 8.0
Flash, PMCC ° F. _____ 180
Pour point, ° F. _____ +35
Viscosity, centistokes _____ 370
Sulfur, percent, weight _____ 1.84
Carbon residue, percent, weight _____ 19.0

30% by weight of the polythiopolymercaptan described in Example I and 27% of tributylamine are then added.

This mixture is then sprayed on a section of an asphaltic roadway to form a coating of about 1/16 inch thick. 30 mesh aluminum oxide was then strewn over the surface before it had set hard. The resulting coating is a hard non-skid coating having good weather resistance.

Related results are obtained by replacing the above-described residual fuel oil with another light fuel oil having the following properties:

Gravity, ° API _____ 17.0
Flash, PMMC, ° F. _____ 176
Pour point, ° F. _____ −10
Viscosity, centistokes _____ 52
Sulfur, percent, weight _____ 1.64
Carbon residue, percent, weight _____ 9.0

*Example XI*

This example illustrates the preparation and some of the properties of a composition containing triglycidyl ester of trimerized linoleic acid, a polythiopolymercaptan as described in Example I and an Edeleanu extract of petroleum distillates.

About 20% by weight of the triglycidyl ester is combined with 10% of dinonyl phenol, 50% by weight of an extract of petroleum distillate having the following properties:

Gravity, ° API _____ 5.8
Flash, coc. ° F. _____ 415
Viscosity, SSU at 210° F. _____ 96.1
Aniline point, ° F. _____ 81
Acid No. (TAN–C) _____ 1.1
Iodine value _____ 69

20% by weight of the polythiopolymercaptan described in Example I is then added. This mixture is combined with 200% by weight of crushed rock aggregate heated to 250° F. and spread out and rolled on prepared roadbed. After compacting, the roadway is allowed to set hard. The resulting roadway is tough and flexible and had good resistance to solvents and heat.

*Example XII*

Examples I, II, IV and X are repeated with the exception that the polythiopolymercaptan is replaced by a polythiopolymercaptan having a mol weight of 3,000. Related results are obtained in each case.

*Example XIII*

Examples VII, X and XI are repeated with the exception that the polythiopolymercaptan is a fluid product having the formula as in Example I and a mol weight of 1,500. Related results are obtained in each case.

*Example XIV*

Example I is repeated with the exception that polyether A is replaced by equivalent amounts of polyether B and polyether C. The same type of tough, flexible solvent resistance coatings are obtained.

We claim as our invention:

1. A composition consisting essentially of the reaction product of a mixture of (1) a polyepoxide having more than one vic-epoxy group, (2) a polythiopolymercaptan, and (3) a petroleum derived bituminous material, the amount of the polyepoxide making up from 15% to 90% by weight of the mixture of polyepoxide and bituminous material, and at least .8 equivalent of the polythiopolymercaptan being used per equivalent of polyepoxide with an equivalent being one —SH group per epoxide group.

2. A composition as in claim 1 wherein the polythiopolymercaptan is a liquid polythiopolymercaptan having a molecular weight between 300 and 10,000.

3. A composition as in claim 1 wherein the polythiopolymercaptan has the structure $$HS-C_2H_4OCH_2OC_2H_4(SSC_2H_4OCH_2OC_2H_4)_nSH$$

wherein $n$ is an integer of 1 to 50.

4. A composition for rendering surfaces non-skid consisting essentially of the reaction product of a mixture of (1) a polyepoxide possessing more than one vic-epoxy group, (2) liquid polythiopolymercaptan, (3) a petroleum derived bituminous material, (4) at least 50% by weight of the combined mixture of 1, 2 and 3 of small inert particles, the amount of the polyepoxide making up from 15% to 90% by weight of the mixture of polyepoxide and bituminous material, and at least .8 equivalent of the polythiopolymercaptan being used per equivalent of polyepoxide with an equivalent being one —SH group per epoxide group.

5. A composition as in claim 4 wherein the polyepoxide is a glycidyl polyether of a polyhydric phenol having a molecular weight between 250 and 900.

6. A composition as in claim 4 wherein the bituminous material is an asphalt.

7. A composition as in claim 4 wherein the bituminous material is a lube oil distillate.

8. A composition as in claim 4 wherein the inert particles are sand.

9. A process for preparing a composition useful for vehicular and pedestrian traffic areas structure which consists essentially of mixing and reacting (1) a polyepoxide having more than one vic-epoxy group, (2) a liquid polythiopolymercaptan and (3) a petroleum derived bituminous material, the amount of the polyepoxide making up from 15% to 90% by weight of the mixture of polyepoxide and bituminous material, and at least .8 equivalent of the polythiopolymercaptan being used per equivalent of polyepoxide with an equivalent being one —SH group per epoxide group.

10. A process for preparing a roadway which consists essentially of mixing a binder comprising a mixture of (1) a polyepoxide having more than one vic-epoxy group, (2) polythiopolymercaptan and (3) a petroleum derived bituminous material, with hot aggregate, spreading the mixture on the roadbed, compacting and allowing to set, the amount of polyepoxide making up from 15% to 90% by weight of the mixture of polyepoxide and bituminous material, and at least .8 equivalent of the polythiopolymercaptan being used per equivalent of polyepoxide with an equivalent being one —SH group per epoxide group.

11. A process for coating surfaces to improve their wear, solvent resistance and skid resistance which consists essentially of applying thereto a layer of a mixture comprising (1) a polyepoxide having more than one vic-epoxy group, (2) a polythiopolymercaptan and (3) a petroleum derived bituminous material, applying small inert particles over the top of the layer of coating material and allowing the mixture to set hard, the amount of the polyepoxide making up from 15% to 90% by weight of the mixture of polyepoxide and bituminous material, and at least .8 equivalent of the polythiopolymercaptan being used per equivalent of polyepoxide with an equivalent being one —SH group per epoxide group.

12. A process as in claim 11 wherein the surface is Portland cement concrete.

13. A process as in claim 11 wherein the surface is asphaltic concrete.

14. A process as in claim 11 wherein the surface is steel.

15. A process as in claim 11 wherein the polyepoxide is a glycidyl polyether of a polyhydric phenol.

16. A process as in claim 11 wherein the bituminous material in the coating is a straight run paving grade asphalt.

17. A process as in claim 11 wherein the bituminous material is a lube oil extract.

18. A composition suitable for use in preparing non-skid surfaces for vehicular and pedestrian traffic areas consisting essentially of the reaction product of (1) glycidyl polyether of a polyhydric phenol of molecular weight between 250 and 900, (2) a petroleum derived asphalt, (3) a liquid polythiopolymercaptan, and (4) a catalytic amount of a tertiary amine, the amount of the polyepoxide making up from 15% to 90% by weight of the mixture of polyepoxide and bituminous material, and at least .8 equivalent of the polythiopolymercaptan being used per equivalent of polyepoxide with an equivalent being one —SH group per epoxide group.

References Cited by the Examiner

UNITED STATES PATENTS

| | | | |
|---|---|---|---|
| 2,466,963 | 4/1949 | Patrick | 260—608 |
| 2,789,958 | 4/1957 | Fettes et al. | 260—79.1 |
| 2,906,720 | 9/1959 | Simpson | 260—28 |
| 2,910,922 | 11/1959 | Horning | 260—79.1 |
| 3,012,485 | 12/1961 | Bradley | 260—28 |
| 3,012,486 | 12/1961 | Newey | 260—28 |
| 3,012,487 | 12/1961 | Milka | 260—28 |
| 3,015,635 | 1/1962 | Bradley et al. | 260—28 |
| 3,105,771 | 10/1963 | Simpson et al. | 260—28 |

OTHER REFERENCES

Abraham, Asphalts and Allied Substances, 5th edition, D. Van Nostrand Co., Inc., N.J., pages 492–3, 636.

Thiokol, Polysulfide, Thiokol Chemical Corp., Trenton, N.J., 1958.

ALEXANDER H. BRODMERKEL, *Primary Examiner.*

MILTON STEARMAN, MORRIS LIEBMAN,

*Examiners.*

J. ZIEGLER, D. C. KOLASCH, J. H. DERRINGTON,

*Assistant Examiners.*